June 12, 1945. A. W. SCHENKER 2,378,039
DEVICE FOR MEASURING PRESSURES EXERTED BY CERTAIN
BODY PORTIONS ON A SUPPORT THEREFOR
Filed April 30, 1942   2 Sheets-Sheet 1

INVENTOR.
Abraham W. Schenker
BY
ATTORNEY

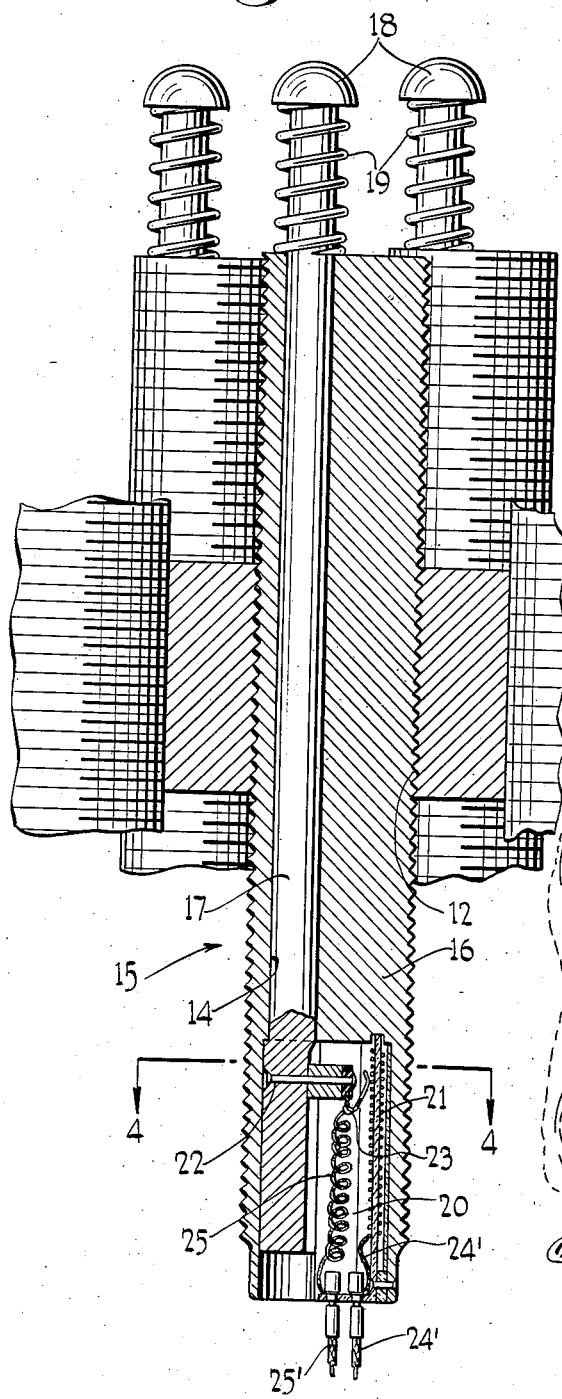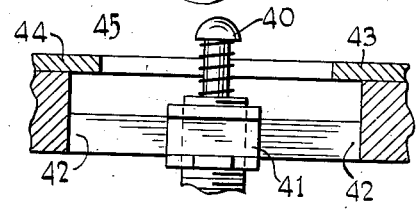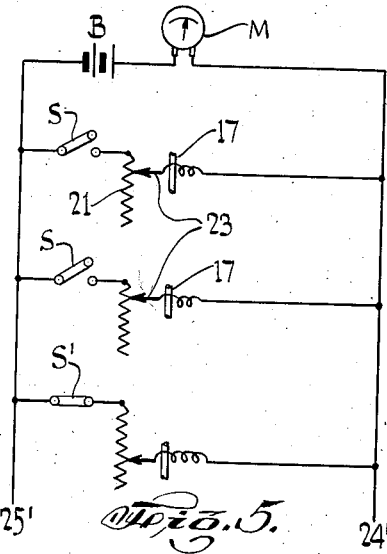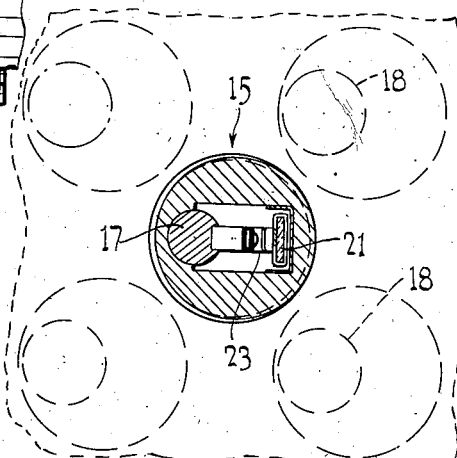

Patented June 12, 1945

2,378,039

UNITED STATES PATENT OFFICE 2,378,039

DEVICE FOR MEASURING PRESSURES EXERTED BY CERTAIN BODY PORTIONS ON A SUPPORT THEREFOR

Abraham W. Schenker, New York, N. Y.

Application April 30, 1942, Serial No. 441,078

2 Claims. (Cl. 73—172)

This invention relates to measuring devices. More particularly my invention contemplates an improved means for determining pressures exerted upon or borne by certain parts of the human body, such as, for example the spinal areas, the legs and feet and thighs.

One of the objects of my invention is to provide a measuring device of the class described which shall be so designed that by placing a person in a reclining or standing position on a support the pressure exerted by certain specified portions of the body upon such support or the weight borne by the said specified portions of the body may be accurately determined in order that properly designed therapeutic appliances may be built to offer relief or cure or to maintain normal healthy conditions.

Further objects and advantages of my invention will hereinafter be pointed out or will become apparent in the following detailed description thereof.

In the accompanying drawings,

Fig. 3 is an enlarged vertical cross-sectional view illustrating the detailed construction of one of the units shown in Fig. 4;

Fig. 4 is a cross-sectional view taken substantially along the line 4—4 of Fig. 3;

Fig. 5 is a wiring diagram illustrating the use of the apparatus of my invention;

Fig. 7 is an enlarged cross-sectional view taken substantially along the line 7—7 of Fig. 6.

Figure 1:
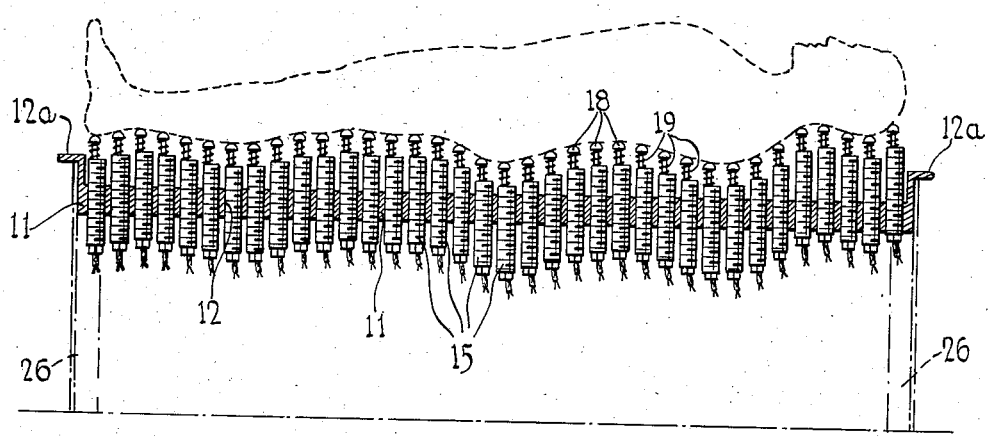
Fig. 1 is a longitudinal sectional view of a measuring apparatus constructed and arranged in accordance with my invention.

Referring now in detail to the drawings I have illustrated in Figures 1 through 5 an apparatus constructed and arranged in accordance with my invention and adapted, in this particular instance, to measure the weight borne by or the pressure exerted upon the posterior portions of the body including the spine when the said body is in reclining position on a bed or similar support. The information thus obtained I have found of great value in constructing beds or similar resting appliances having therapeutic corrective value or increased relaxing value, such as for example a device of the type shown, described and claimed in my copending application Serial No. 398,798 filed June 19, 1941, for Bed or similar body resting appliance.

The apparatus 10 of my invention comprises a horizontal supporting member 11 of suitable rigid material, such as, for example, metallic material having a plurality of internally threaded through openings 12, spaced from each other a predetermined distance, and substantially covering the entire area of the said member 11. Threadedly received in the openings 12 are measuring units 15.

Since each of the units 15 are of similar construction I shall describe in detail a single unit, it being understood that the other units 15 are as clearly shown in Fig. 3 of the drawings.

The said unit 15 comprises a support member 16 of suitable rigid material and externally threaded to correspond to the threads in the opening 12. The support 16 is in turn provided with a longitudinal opening 14 into which there is axially slidably received a rod 17. The said rod 17 is provided at its upper end with an enlarged head portion 18 which is preferably rounded off as shown because it is adapted to intimately contact portions of the body and might otherwise cause discomfort to the patient. Encircling the rod 17 and interposed between the head 18 and the support 16 is a compression spring 19 of predetermined strength in accordance with needs of the invention. By the above described construction it is noted that the spring 19 normally maintains the rod 17 in a position projecting above the support 16 and that when any downward pressure is exerted or any weight placed upon the rod 17 it will be slidably moved downwardly against the action of the spring 19.

Figure 2:
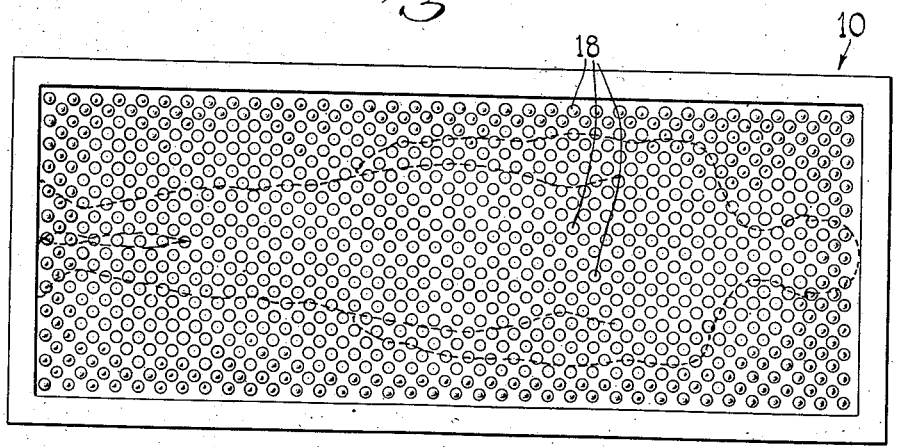
Fig. 2 is a top plan view thereof.

It is here noted that a sufficient number of units 15 may be provided to cover an area sufficiently large enough to place thereon a human person in reclining position so that, as shown in Figs. 1 and 2 of the drawings, the body may be entirely supported by the enlarged heads 18 of the rods 17.

It is understood that when in such reclining position different parts of the body will exert different pressures upon the rods 17. In order to determine such pressures at selected portions of the body I have, in accordance with my invention, provided the following construction and arrangement.

At a desired portion of the support 16 a chamber 20 is provided which communicates with the opening 14. Suitably secured within the chamber 20 for movement with the support 16 is an electric rheostat device 21 of any well known type of construction.

Secured to the rod 17 for movement therewith, by any suitable means such as for example the rivet member 22 is a resilient contact finger 23 of electrically conductive material and normally in contactive engagement with the rheostat 21. The rheostat 21 and finger 23 are connected to a source of current supply B (see Fig. 5) by means of the lead lines 24' and 25' respectively. In the above described circuit there is placed a suitable meter M. The meter M may be so adjusted that it will register at zero when the rods 17 are in position without any pressure on the springs 19, in which event the finger contact 23 will be positioned adjacent the upper end of the rheostat 21. When the rods 17 are forced downwardly against the action of the springs 19 the fingers 23 will move down correspondingly along the rheostat 21 to actuate the needle of the meter M due to the different amount of current passing therethrough to register the amount of pressure on the rods 17.

As shown in Fig. 5 a single meter M may be placed in the circuit including all the units 16 but a separate switch may be provided to control each unit 16. Thus, for example, in Fig. 5, all the switches S are open with the exception of the switch S' and therefore the pressure of that portion of the body contacting the rod 17 corresponding to the switch S' will be registered on the meter M. In this manner, by selectively closing the switches S the pressure on any desired rod 17 may be determined.

In accordance with my invention the normal position of the finger 23 with respect to the rheostat 21, while the head 18 of the pin 17 is in contactive engagement with a body portion, may be altered as desired by turning the support 16 either in a clockwise or counter clockwise direction to raise or lower the said support 16 by either compressing or releasing the compression spring 19 to thereby raise or lower the contact finger along the rheostat. By the above described construction it is also to be noted that each rod can be adjustably moved to a height so as to carry a desired part of the weight of the body and the bed or other body appliance can be designed in accordance with the varying height of the heads 18 of the rods 17 with respect to a horizontal base line.

The main supporting member 12 for the units 15 may be in turn supported by means of uprights 26 resting upon a floor surface and upon which peripheral flanges 12a of the member 12, are adapted to rest. Any other suitable well known supporting means for the member 12 may be employed.

Any arrangement for the units 15 may be employed to cover the desired area such as for example the plurality of rows shown in Fig. 2 of the drawings in which adjacent rows are in staggered relationship.

Figure 6:
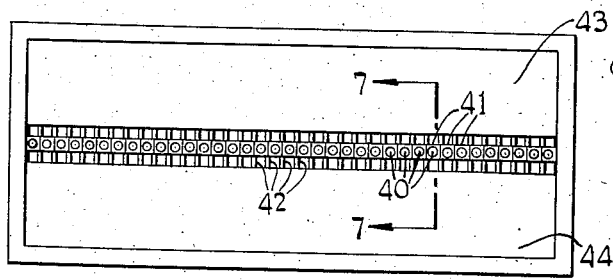
Fig. 6 is a top plan view of a measuring apparatus, similar to Fig. 2, but of reduced size and illustrating a modified form of my invention.

In Figs. 6 and 7 I have shown a modified form of my invention in which the same construction and the same principle of operation for the measuring units are employed as in the Figs. 1 to 5 form of my invention but in which the units, which in this form are designated as 40, are each mounted upon individual supporting members 41 instead of the member 12 the said supporting members 41 being in turn laterally slidable in tracks 42. This form of my invention is particularly suitable for use in measuring certain predetermined body portions such as for example the spine in which case the units 40 can follow the lateral curvature of the spine as well as the antero-posterior curvatures.

In the Figs. 6 and 7 form of my invention, the body, instead of resting solely upon the units may be supported by rigid flat supporting members 43 and 44 on opposite sides of the channel 45.

While in the drawings I have illustrated my invention as applied to the measurement of the forces exerted by a body in fully reclined position, it is understood that the same may be satisfactorily applied to determining such pressures of the body when in semi-reclining, sitting or standing position.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a measuring device of the class described, a plurality of axially movable rod members adapted to support the weight of predetermined areas of the human body thereon, a separate support for each of said rod members, a general support for said separate supports, means associated with said rod members for indicating the relative pressures exerted between said rod members and said predetermined body areas and means for increasing or decreasing the indicated relative pressures while said body areas are being supported whereby each of the rod members may be made to support an equal amount of weight of said predetermined body areas, said means comprising a threaded portion of said separate support received in a correspondingly threaded portion of said general support.

2. In a measuring device of the class described, the combination of a plurality of axially slidably movable rod members adapted to support the weight of predetermined areas of the human body, a separate support for each of said rod members, resilient means for normally maintaining said rods at a uniform level with respect to their separate supports, said resilient means including a spring of predetermined strength for each rod member, electrical means associated with said rod members for indicating the relative pressures exerted between said rod members and said predetermined body areas, and means for increasing or decreasing the said indicated relative pressures while said body portion is being supported by said rod members so that each rod member may be made to support an equal share of the weight of said predetermined body portion, said last named means comprising means for enabling movement of said separate support with respect to the rod member supported thereby

ABRAHAM W. SCHENKER.